(12) United States Patent
Meunier et al.

(10) Patent No.: US 8,306,679 B2
(45) Date of Patent: Nov. 6, 2012

(54) METHOD OF PROTECTING AN AIRCRAFT BY SIGNALLING AGAINST THE RISKS OF COLLISION WITH THE TERRAIN IN PROCEDURES WITH REDUCED PROTECTION CORRIDOR WITH SPECIFIC FUNCTIONS

(75) Inventors: Hugues Meunier, Frouzins (FR); Nicolas Marty, Saint Sauveur (FR); Aurélie Sallier, Toulouse (FR)

(73) Assignee: Thales, Neuilly sur Seine (FR)

( * ) Notice: Subject to any disclaimer, the term of this patent is extended or adjusted under 35 U.S.C. 154(b) by 985 days.

(21) Appl. No.: 12/270,305

(22) Filed: Nov. 13, 2008

(65) Prior Publication Data

US 2009/0138145 A1 May 28, 2009

(30) Foreign Application Priority Data

Nov. 14, 2007 (FR) ...................................... 07 07993

(51) Int. Cl.
*G01C 21/36* (2006.01)
(52) U.S. Cl. ................... 701/9; 701/10; 701/14; 701/16
(58) Field of Classification Search ................ 701/3–17; 340/947–979
See application file for complete search history.

(56) References Cited

U.S. PATENT DOCUMENTS

| | | | |
|---|---|---|---|
| 6,347,263 B1 * | 2/2002 | Johnson et al. | 701/14 |
| 6,567,728 B1 * | 5/2003 | Kelly et al. | 701/9 |
| 2008/0281522 A1 | 11/2008 | Sublet | |
| 2011/0029162 A1 * | 2/2011 | Ishihara et al. | 701/9 |

FOREIGN PATENT DOCUMENTS

| | | |
|---|---|---|
| EP | 1 857 781 A | 11/2007 |
| FR | 2 893 174 A | 5/2007 |
| WO | 02/059547 A | 8/2002 |

* cited by examiner

*Primary Examiner* — Richard M. Camby
(74) *Attorney, Agent, or Firm* — Lowe, Hauptman, Ham & Berner (57) ABSTRACT

The present invention relates to a method of protecting an aircraft in approach by signalling against the risks of collision with the terrain in steep-sided environments, in order to avoid unwanted warnings emanating from the clearance sensors of the onboard TAWS system while protecting the aircraft when it fails to observe the published procedure, and this equally in a landing procedure and in a take-off procedure. The method includes conferring an additional function on the conventional TAWS functions, specific to the detection of the potential risks of collision of the aircraft with the terrain when following procedures of reduced protection corridor type, and this without modifying either the logics or the characteristics of the clearance sensor or sensors as currently defined in the TAWSs of the state of the art.

13 Claims, 5 Drawing Sheets

METHOD OF PROTECTING AN AIRCRAFT BY SIGNALLING AGAINST THE RISKS OF COLLISION WITH THE TERRAIN IN PROCEDURES WITH REDUCED PROTECTION CORRIDOR WITH SPECIFIC FUNCTIONS

RELATED APPLICATION

The present application is based on, and claims priority form, French Application Number 07 07993, filed on Nov. 14, 2007, the disclosure of which is hereby incorporated by reference herein in its entirety.

BACKGROUND OF THE INVENTION

1. Field of the Invention

The present invention relates to a method of protecting an aircraft by signalling against the risks of collision with the terrain in procedures with reduced protection corridor with functions that are specific to these procedures, in order to avoid unwanted warnings emanating from the clearance sensors of the onboard system for automatically signalling risks of collision with the terrain.

2. Description of Related Art

The onboard systems for automatically signalling risks of collision with the terrain, commonly designated by the term "TAWS" ("terrain awareness and warning system") are stand alone computers or computers integrated with other functions such as the TCAS and WXR in onboard ISS ("integrated surveillance system") type systems. These TAWS systems fulfil an anticollision surveillance function ("safety net") with the terrain and their aim is to issue audible warnings on an unintentional approach with the relief, so enabling the crew to react by engaging a vertical resource (called "pull-up") to avoid the relief before it is too late. To do this, the TAWS systems, independently of the onboard navigation systems, periodically compare the predicted trajectory of the aircraft—including the theoretical trajectory that the aircraft would describe in a "pull-up" type resource—with the terrain being flown over obtained from an onboard digital terrain model (preferably a world model) installed on the computer.

In order to satisfy the increasing demands in terms of air traffic capacity and efficiency, in particular to allow access to certain terrains in steep-sided environments (such as Palm Springs, Calif., or Queenstown, New Zealand), new approach procedures have been introduced (in 2005 in the USA, then elsewhere). These approaches are known by the term RNP, and in particular for some by the name—RNP AR APCH (RNP authorization required approach), previously called RNP SAAAR (required navigation performance—special aircraft aircrew authorization required). They are defined in the ICAO documents referenced PBN No. 9613 and FAA Notice 8260.52 (PBN stands for "performance based navigation").

The design of these approach procedures is fairly flexible in their creation, because this design is based on the demand for a high level, defined by the standards, of accuracy and integrity of positioning on board the aircraft which will be required to follow this approach. The RNP procedures (predefined trajectories) define a corridor created with a lateral and vertical "framing" determined with a predefined high level of integrity. The RNP AR APCH approaches correspond to approaches with RNPs (lateral distance of the trajectory of the aircraft at the nearest edge of the corridor) typically between 0.3 NM and 0.1 NM (NM standing for nautical miles), that is that the distance for which the RNP AR APCH procedures are defined is equal to twice the value of the RNP between the route to be followed and each side of the procedure so as to protect the route of the aircraft from potential obstacles with a probability of $1.10^{-5}$, the lateral deviation tolerance of 0.3 to 0.1 NM relative to the prescribed ideal RNP AR APCH trajectory being given for 95% of cases. Furthermore, these approaches require the aircraft and the crew to be specially provided with special qualifications to be performed.

It will be noted that there are currently several RNP-type and similar procedures ("low RNP"), ("RNP AR APCH", "RNAV", etc.). Hereinafter in the text, they will simply be named RNP, but obviously this term here designates any procedure with reduced protection corridor.

On such RNP approaches, the trajectory to be followed is often close to the terrain and along a predefined path, rarely in a straight line. A TAWS system is therefore, even more than for other approaches or situations close to the ground, a precious aid and is even mandatory to perform this type of approach.

However, even more than for other approaches, such a TAWS system ought not to generate unwanted warnings. In practice, such warnings can place the aircraft in extremely difficult situations, because avoidance manoeuvres are not always easy to execute along such approaches.

Now, the design of the current TAWS is such that the protection and warning logics are totally independent of the trajectories followed by the aircraft, because the trajectories to be protected are often less constrained, with or without FMS engaged, than these new approaches, which, it should be remembered, require special authorizations on a per-case basis to be able to be followed.

Consequently, although the TAWS logics are well dimensioned for the general cases, they can be the source of unwanted warnings in RNP approaches, and in particular RNP AR APCH approaches, because the current warning logics are based on a prediction of the future position of the aircraft which cannot be really the position that the aircraft will have a few instants later.

Typically, the current TAWS systems basically comprise at least one or two (even several) clearance sensors, that is, virtual surfaces calculated by the onboard computer and delimiting an exploration volume of the space that is compared to the topography of the corresponding terrain as supplied by an onboard terrain database. The origin of these clearance sensors is located at the predicted position of the aircraft, and consists of an extrapolation of the current trajectory followed by a trajectory representing, taking into account a margin, an avoidance trajectory, and this in a lateral segment to take account of lateral tolerances.

These clearance sensors are determined from parameters of the aircraft such as position, speed, heading or route, altitudes or heights, etc., supplied by the sensors on board this aircraft.

These clearance sensors are used to determine the risks of collision with the terrain by using a database containing at least the elevations of the different areas being flown over.

Figure 1:
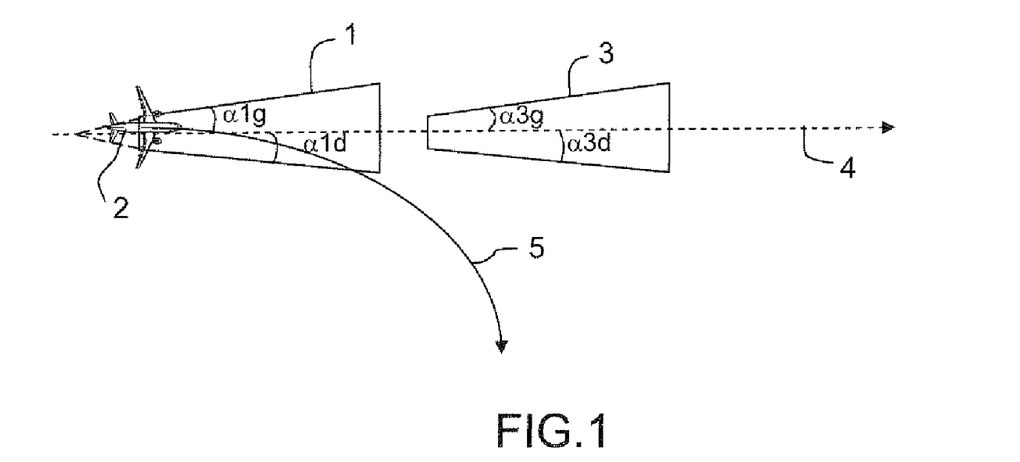
FIG. 1 is a simplified diagram explaining a warning type alert clearance sensor of a TAWS system and highlighting the problems that can occur when following an RNP trajectory using a pull-up maneuver.

As illustrated in FIG. 1, the first clearance sensor (1) is determined at most a few seconds in front of the aircraft (2) and is dedicated to the generation of a "warning" type alert (warning of danger involving a resource manoeuvre called "pull-up"). Advantageously, another clearance sensor is determined (3), more in front of the aircraft (typically 30 seconds), and is dedicated to the generation of a "caution" type alert (that is: "attention!") of lesser importance. As illustrated in FIG. 1, which relates to the case of an initial straight-line trajectory, followed, a little after the instant at which the aircraft has been represented, by a trajectory tending towards the right, as long as this trajectory is straight, these clearance sensors have as their common generation axis the instantaneous route 4 of the aircraft. The problems posed by the curvilinear trajectory (5) are explained hereinbelow with reference to FIGS. 3 to 5 more particularly for the "caution" clearance sensor, even though, to a lesser extent, this problem also concerns the "warning" clearance sensor, provided that its start is not geolocated with the current position of the aircraft.

In certain TAWS systems, the generation axis of the "caution" clearance sensor, like that of the "warning" clearance sensor, is situated in the axis of the instantaneous route of the aircraft (as represented in FIG. 1). In other, more sophisticated TAWS systems, at least one of the clearance sensors, and in particular the "caution" clearance sensor, is situated and oriented along the predicted trajectory of the aircraft, according to a law which is a function of all or part of the instantaneous roll rate. Furthermore, the opening angle (angle of each of the sides of the clearance sensor relative to its generation axis: α1g and α1d for the clearance sensor 1 and α3g and α3d for the clearance sensor 3) of the clearance sensors is more or less great, opening in the direction of the turn, according to a law which is a function of all or part of the instantaneous roll rate, as represented in FIG. 1.

Figure 2:
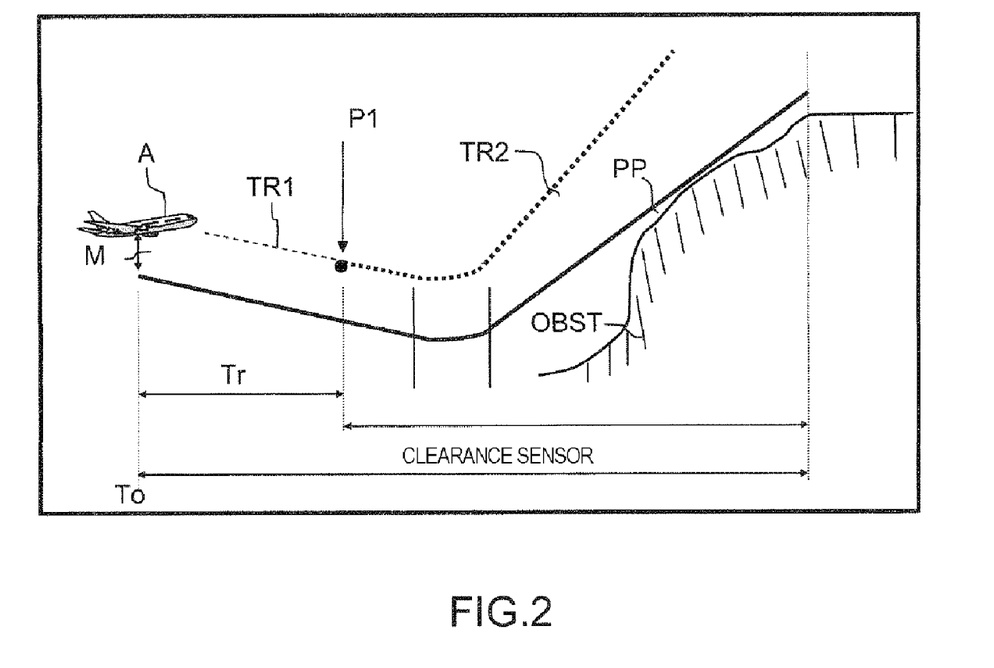
FIG. 2 is a simplified lateral view of FIG. 1.
Figure 2A:
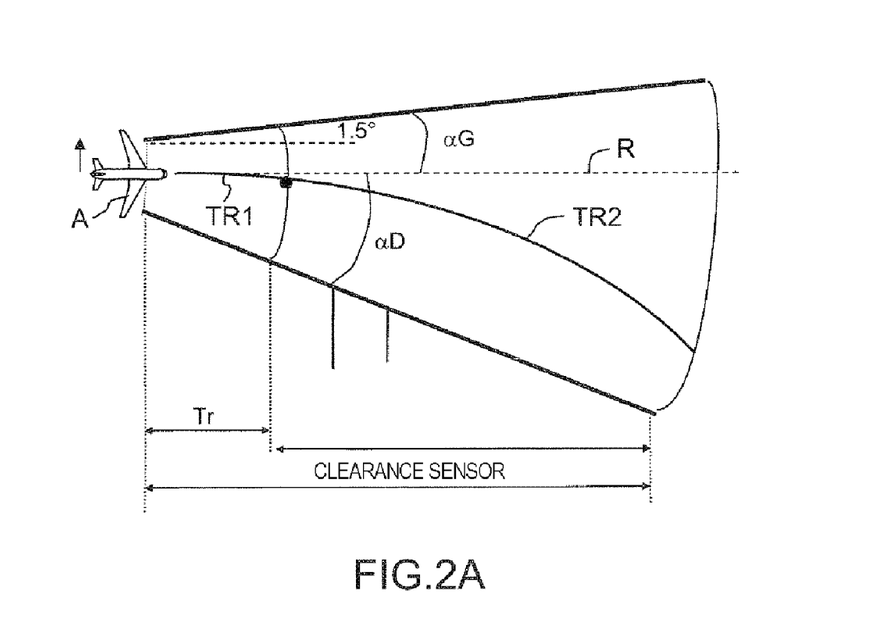
FIG. 2A is a simplified top view of FIG. 1

FIGS. 2 (lateral view) and 2A (top view) are diagrams explaining a conventional clearance sensor as considered for the present invention, but without excluding other forms of clearance sensor to which the present invention would be applied. This clearance sensor is created so as to cover the case of a "pull-up" manoeuvre that an aircraft A (represented at an instant T0) must undertake at the latest at a point P1 (that the aircraft will reach after a time period Tr) in order to avoid an obstacle OBST (a hill, for example) situated in front of the aircraft A. A vertical distance between the clearance sensor and the obstacle OBST is defined so that the resource that the aircraft A must begin at the latest at the point P1 is such that the trajectory TR2 of the aircraft beyond P1 will make it possible to retain at least a margin M with the obstacle. In the top view of FIG. 2A, R represents the direction of the route of the aircraft before it begins its obstacle avoidance manoeuvre to the right. Bold lines represent the lateral limits of its "warning" clearance sensor. The left limit forms an angle αG (typically 1.5°) relative to the direction R, and the right limit forms an angle αD, greater than αG, relative to the direction R.

Figure 3:
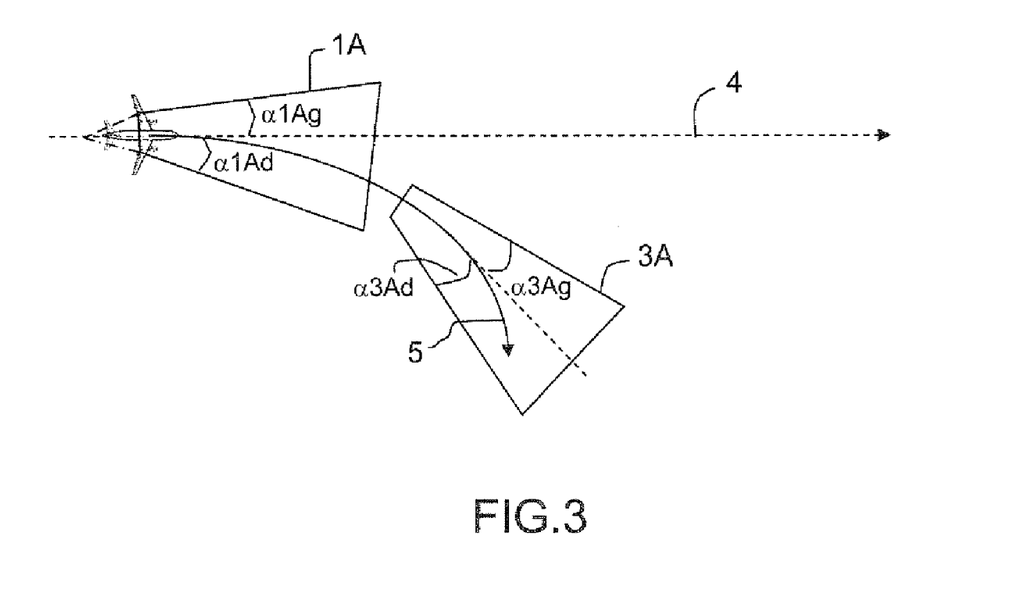
FIG. 3 similar to FIG. 1, is a simplified diagram explaining a warming type alert clearance sensor of a TAWS system and highlighting the problems that can occur in the absence of a published RNP trajectory.

FIG. 3 relates to the case where the aircraft 2 is on the point of beginning a curved trajectory 5 to the right, in the absence of published RNP trajectory. In the case of more sophisticated known TAWS systems, the system then calculates a "warning" clearance sensor 1A, the generation axis of which is oriented along the instantaneous axis of the aircraft at the start point of this clearance sensor and the opening angle α1Ad of which is greater than the angle α1d of FIG. 1, and a "caution" clearance sensor 3A also oriented along the instantaneous axis of the aircraft at the start point of this clearance sensor (notably offcentred relative to the axis of the trajectory 4 and the opening angle α3Ad of which is greater than the angle α3d of FIG. 1).

Figure 4:
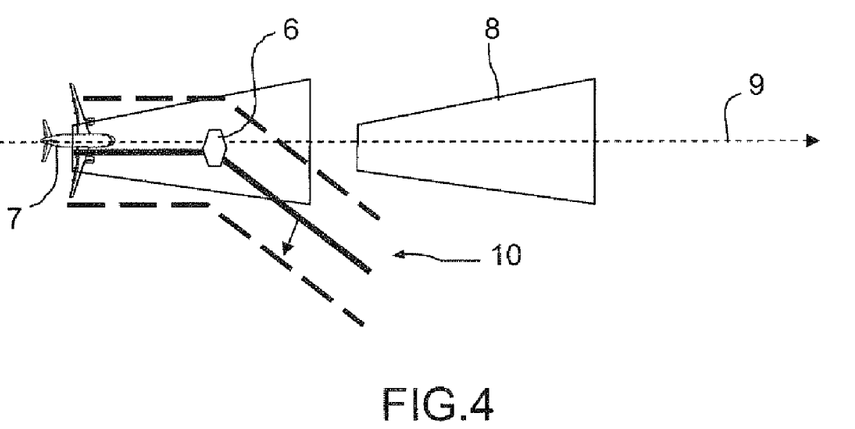
FIG. 4 is a simplified top view of FIG. 3 including a turning point.
Figure 5:
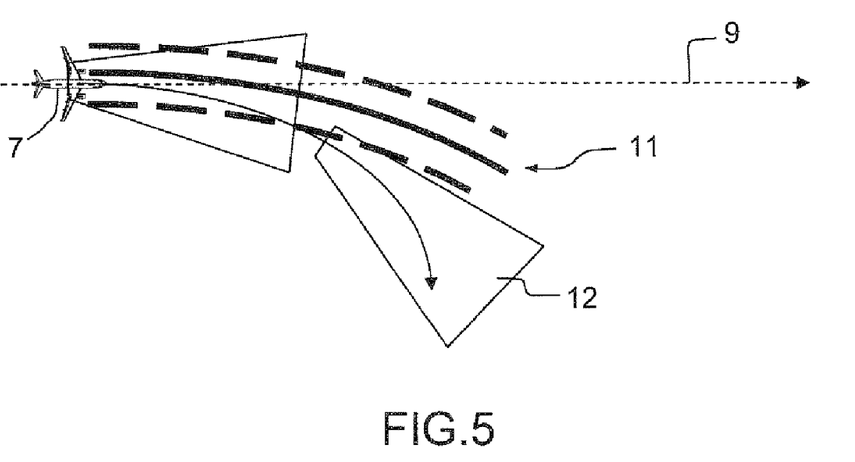
FIG. 5 is a simplified top view of FIG. 3 when a projected trajectory is greater than an actual rate of turn.
Figure 6:
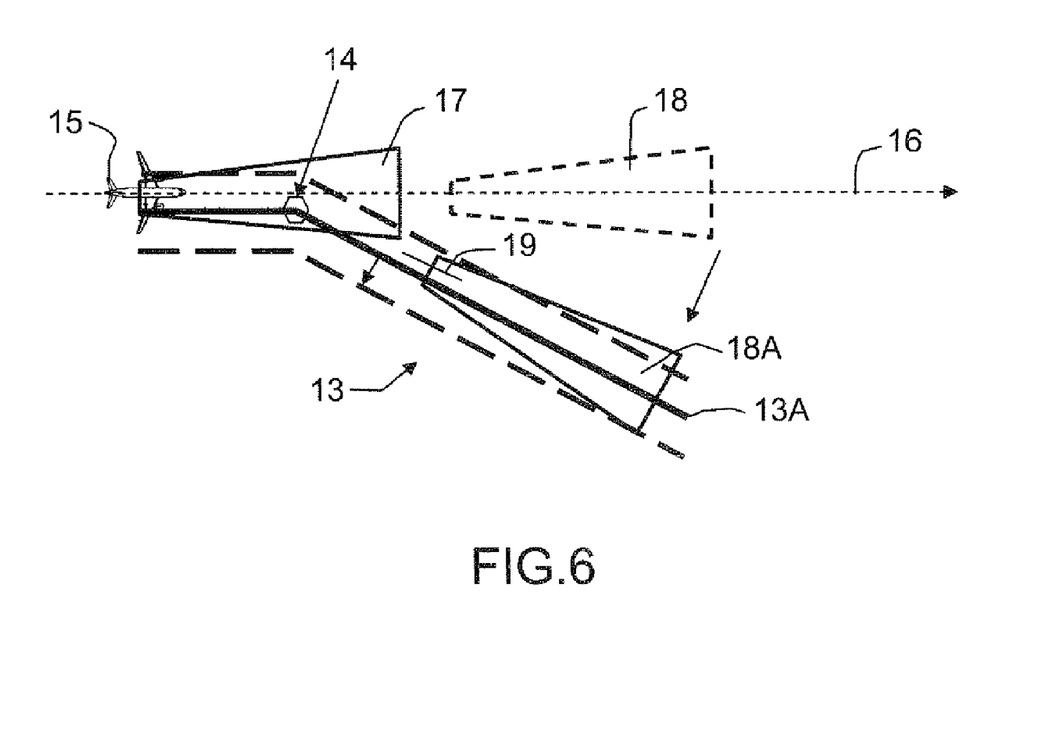
FIG. 6 is a simplified diagram explaining a warning type alert clearance sensor.

Even if such a prediction can still be acceptable for the "warning" clearance sensor, it may prove "unorthodox" for the "caution" clearance sensor relative to the reality of the procedure. The predicted positions can thus be notably offset relative to the accepted position tolerance (1 or 2 RNP). Similarly, the exploration segment (the opening angle of the clearance sensor) can notably be offcentred relative to the very probable future orientation of the aircraft. In practice:

As represented in FIG. 4, in the presence of a "turning point" 6 on the trajectory in front of the aircraft 7 predetermined by the published RNP procedure that the aircraft must follow, the "caution" clearance sensor 8 may be situated and remain oriented along the predicted trajectory 9, totally different from the position and the probable future orientation of the aircraft in 30 seconds (RNP trajectory 10 turning to the right from the turning point 6), hence a certain increase in the probability of generating unwanted warnings. In this FIG. 4, as in the subsequent figures, the RNP trajectory has been represented by a "corridor" delimited by broken bold lines and its axis is represented by a continuous bold line. Obviously, the width of this corridor is modulated according to the definition of the procedure.

Similarly, if the predicted trajectory of the aircraft, according to a law which is a function of all or part of the instantaneous roll rate, is greater (as in FIG. 5), or less than the actual rate of turn of the trajectory prescribed by the published RNP procedure, it can prove "unorthodox" relative to the reality of the procedure and thus be notably offset relative to the trajectory to be followed. Taking into account the instantaneous roll of the aircraft 7 to determine the position of the caution clearance sensor 12 can cause this clearance sensor to examine an inappropriate segment, outside the RNP trajectory 11.

It should be noted that, even if, for such approaches, the aircraft must be qualified to perform RNP approaches and have onboard systems guaranteeing the precision and the integrity of the aircraft position, its TAWS must remain operational to monitor errors of altitude and to intervene in the case of failure to observe the required precision, for example in the case of failure of certain onboard systems.

This therefore means, for the TAWS, having an operation with the fewest unwanted warnings when the aircraft follows the prescribed procedure, and on the other hand fully retaining its nominal warning mode when this procedure is no longer followed.

A terrain avoidance device for aeroplanes is known according to the patent application EP 1 857 781 A2, in which it is simply specified that the "warning" clearance sensor alone is reduced so as to enter into the RNP volume and possibly offcentred to be "centred" on the RNP trajectory, which does not make it possible to adapt the clearance sensor to all the RNP situations and avoid unwanted warnings.

SUMMARY OF THE INVENTION

One object of the present invention is a method of protecting an aircraft in approach phase by signalling against the risks of collision with the terrain in constrained environments, in order to avoid unwanted warnings emanating from the clearance sensors of the onboard TAWS system for automatically signalling risks of collision with the terrain, while protecting the aircraft when it fails to observe the published procedure, and this equally in a landing procedure and in a take-off procedure.

Another object of the present invention is a device for implementing this method, a device that is easy to put in place and requires only the minimum possible modifications of the existing equipment.

The method according to the invention is characterized in that it consists in conferring an additional function on the conventional TAWS functions, specific to the detection of the potential risks of collision of the aircraft with the terrain when following procedures of reduced protection corridor type, and this without modifying either the logics or the characteristics of the clearance sensor or sensors as defined currently in the TAWSs of the state of the art.

According to a feature of the invention, said additional function is conferred on the TAWS functions when the aircraft follows an RNP procedure.

According to another feature of the invention, the profile of each clearance sensor is compared, in a vertical plane, with the profile of the terrain being flown over, under the duly determined clearance sensors, a warning is issued when the distance between these two profiles drops below a determined threshold.

According to another feature of the invention, a specific warning (typically "recover altitude") is generated when in RNP mode the system determines, under the prescribed altitude of the RNP trajectory, a distance between the profile of a clearance sensor and the profile of the terrain being flown over that is less than a predetermined threshold.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

The aim of the inventive method is to satisfy the operational objectives expected of the TAWS systems and the current limitations on their operation in RNP approaches, namely:

minimization of the occasional unwanted warnings in these RNP-type approaches, conventional protection when the procedure is no longer followed, that is, switchover to conventional TAWS operation.

Moreover, the object of the present invention is to satisfy the operational objectives expected of the TAWS systems without modifications to the logics of these systems, by adding an additional function specific to the protection required for the RNP procedures, cooperative with the logics currently implemented in the so-called "conventional" TAWSs in order to supply an appropriate warning with the minimum of nuisances.

The inventive method is based on the taking into account by the TAWS system of the RNP AR APCH procedure to be followed (also here called RNP procedure) as published. Each RNP procedure that is compatible with the possibilities of the TAWS is stored in the equipment (or supplied by other onboard equipment such as the FMS, or other system—or even obtained by "datalink").

In order to minimize the potential unwanted warnings in RNP-type approaches, the inventive method consists in using the published RNP procedure (the trajectory to be followed) to compare the vertical profile of the clearance sensors with the profile of the terrain being flown over in the corridor defined by the RNP procedure. Advantageously, the vertical deployment of the clearance sensor or sensors is limited to the predefined altitude for the bottom of the corridor or the nominal altitude for following the procedure (with optional margin). In this case, the warning that would be triggered if the clearance sensor were too close to the profile of the terrain being flown over-advantageously supplied by a specific database containing at least the vertical profile (in elevation) of the RNP procedure concerned—is of the "recover altitude" type for example.

Figure 7:
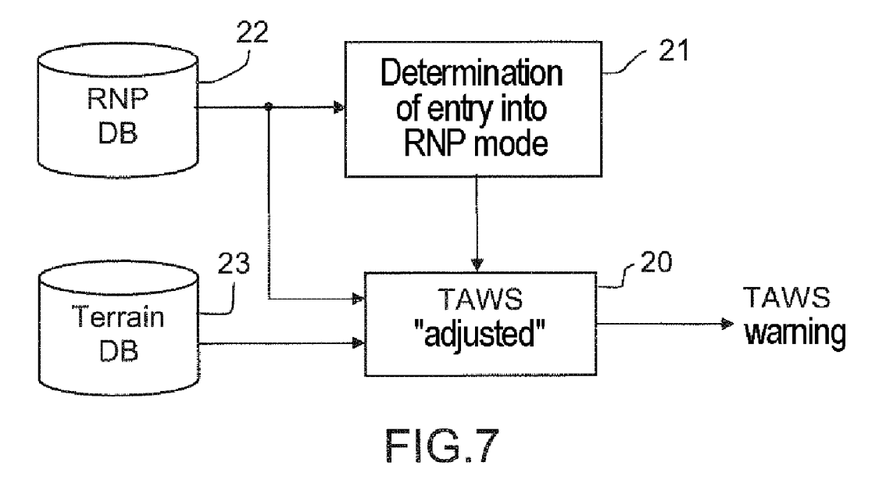
FIG. 7 is a block diagram of an embodiment of a system implementing the method of the invention.

FIG. 7 is a block diagram of a system implementing the inventive method.

The embodiment of FIG. 7 mainly comprises a specific TAWS 20, in addition to a conventional TAWS 21 (not modified). The TAWS 20 is a simplified conventional TAWS which is activated by the device 22 only when an RNP procedure is undertaken, so as to monitor the position of the aircraft in a vertical plane. The TAWS 20 is controlled by a device 22 for activating the RNP mode and a device 23 for laterally monitoring the position of the aircraft in RNP mode.

Figure 8:
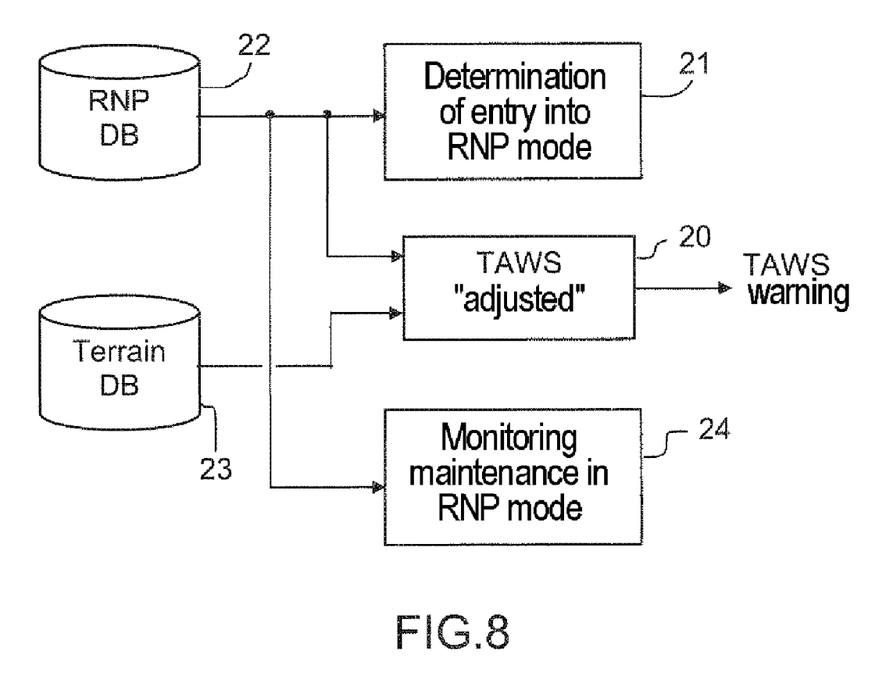
FIG. 8 is a block diagram of a system according to some embodiments.

In the embodiment of FIG. 8, an SAAAR-DB database 24 is linked to the two devices 22 and 23, and a database 25 of simplified flying laws is linked to the device 23. The conventional TAWS 21 is optionally linked to a high-resolution terrain database 26. The database 24 comprises all the data relating to the geometrical description of the planned RNP procedures, whereas the database 26 comprises the high-resolution terrain data. In practice, currently, the terrain databases are used with cells of resolution (size of the side of these cells) equal to 30 arc-seconds (seconds of arc), that is, ½ NM, or even, sometimes, for airports in mountainous areas, 15 arc-seconds (that is, ¼ NM). However, the present invention preferably uses a "high-resolution" terrain database, that is, a resolution such that the size of the cells is less than these current values, for example typically approximately 6 arc-seconds or 3 arc-seconds, even 1 arc-second. These high-resolution data relate to the terrain profiles located under the RNP corridors. These data can be calculated out of use, on production of the database 24, and they can advantageously be validated on RNP test flights.

The entry into the RNP mode is designed as the result of a comparison of the current position of the aircraft with the position or positions of the input points of a stored RNP procedure, if the result of this comparison is less than a maximum deviation (typically of + or −1 or 2 RNP).

The presence in the RNP mode is designed as the mapping of the current position of the aircraft with any point on the stored RNP procedure, given a maximum lateral deviation (typically of + or −1 or 2 RNP).

The maintenance in the RNP mode is designed either as the mapping of the current position of the aircraft with a point on the stored RNP procedure, given a maximum lateral deviation (typically of + or −1 or 2 RNP), or as the prediction, given the instantaneous speeds and route of the aircraft and, advantageously, its roll and/or its dynamics, of the coincidence of the position of the aircraft with any point of the stored RNP procedure, given a maximum lateral deviation (typically of + or −1 or 2 RNP).

The outputs of the devices 20, 21 and 23 are linked to a device 27 for filtering warnings which is controlled by the device 23 (the output signal of which is the quality signal for following RNP procedures as described hereinabove) and which issues a TAWS warning according to this following quality signal. The filter 27 is responsible for issuing the warnings in conventional operating mode and when following the RNP procedure.

The TAWS 20 is adapted to compare the characteristics of the clearance sensors, in the vertical direction, with the profile of the terrain under the aircraft, in the manner explained hereinabove with reference to FIG. 2. The operation of the devices 22 and 23 is based on the correlation between the position of the aircraft and the RNP trajectory predefined in the database and the determination of the probability of maintaining in the mode taking into account the dynamics of the aircraft, its position and its instantaneous route relative to the RNP trajectory predefined in the database.

The device 23 determines a lateral RNP procedure following quality. The following quality signal can take three different values.

if the estimated position of the aircraft presents a lateral deviation less than a first threshold relative to the prescribed trajectory (for example a deviation of less than 1 RNP), the characteristics of the clearance sensor or sensors are adjusted so as to constrain this sensor or these sensors within the limits of the RNP trajectory as long as the aircraft observes it if the estimated position of the aircraft presents a lateral deviation greater than a second threshold relative to the prescribed trajectory (for example a deviation of more than 2 RNP relative to the prescribed trajectory), the characteristics of the clearance sensor or sensors continue to be determined according to the prior art by the TAWS operating in conventional mode, and if the estimated position of the aircraft presents a lateral deviation between the abovementioned two thresholds relative to the prescribed trajectory, the characteristics of the clearance sensor or sensors result from a combination between the adjustment as performed hereinbelow of the first threshold and the determination by the TAWS operating in conventional mode above the second threshold.

This activation (or inhibition) of the RNP mode makes it possible to switch between the RNP mode and the conventional mode. Advantageously, a transition function between the two modes is provided, which performs an averaging (or barycentring) between the positions, orientations and/or openings of the clearance sensor or sensors between the values that it/they would have in each of the modes, in order to allow a "flexible" transition (a transition without abrupt variations from one position/orientation/opening to another).

To resume, the main characteristics of the inventive solution are:
determination of the entry into a RNP procedure,
"recover altitude" specific warning if the altitude of the aircraft is too low on the RNP trajectory being followed,
use of performance characteristics relating to the clearance sensors specific to the AP (automatic pilot) modes engaged (different from those used conventionally).
advantageous use of a terrain database having a greater resolution,
locally inhibited false alarms.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. Method of protecting by signalling using a Terrain Awareness and Alerting Systems (TAWS) system against the risks of collision of an aircraft with the terrain in approach procedures with reduced protection corridor, comprising:
conferring an additional function to the TAWS functions, specific to these procedures for detecting a potential risk of collision of the aircraft with the terrain when following procedures with a reduced protection corridor type, wherein said additional function is conferred on the TAWS functions when the aircraft follows a Required Navigation Performance (RNP) procedure.

2. Method according to claim 1, wherein the system compares, in a vertical plane, the profile of each clearance sensor with the profile of the terrain being flown over, under the duly determined clearance sensors, and that a warning is issued when the distance between these two profiles drops below a determined threshold (M).

3. Method according to claim 1, wherein a specific warning is generated by the system when, in RNP mode, it determines, under the prescribed altitude of the RNP trajectory, a distance between the profile of a clearance sensor and the profile of the terrain being flown over that is less than a predetermined threshold.

4. Method according to claim 3, wherein the warning is a "recover altitude" warning.

5. Device for protecting by signalling against the risks of collision with the terrain in procedures with reduced protection corridor, characterized in that it comprises two Terrain Awareness and Alerting Systems (TAWS) systems, a device for determining entry into a Required Navigation Performance (RNP) mode, a device for determining lateral procedure following quality, a Special Aircraft Aircrew Authorization Required (SAAAR) database and a terrain database and a warning filter, the output of which is common to the output of one of the two TAWS systems.

6. Device according to claim 5, wherein one of the two TAWS systems is a conventional TAWS system, and the other a TAWS system adapted to monitoring the position of the aircraft in a vertical plane.

7. Device according to claim 5, wherein the terrain database is of high-resolution type, that is, with a resolution less than 30 arc-seconds.

8. Device according to claim 7, wherein the resolution is 6 or 3 arc-seconds.

9. Method of protecting by signalling using a Terrain Awareness and Alerting Systems (TAWS) system against the risks of collision of an aircraft with the terrain in approach procedures with reduced protection corridor, comprising:

conferring an additional function to the TAWS functions, specific to these procedures for detecting a potential risk of collision of the aircraft with the terrain when following procedures with reduced protection corridor type, wherein the system compares, in a vertical plane, the profile of each clearance sensor with the profile of the terrain being flown over, under the duly determined clearance sensors, and that a warning is issued when the distance between these two profiles drops below a determined threshold (M).

10. Method of protecting by signalling using a Terrain Awareness and Alerting Systems (TAWS) system against the risks of collision of an aircraft with the terrain in approach procedures with reduced protection corridor, comprising:

conferring an additional function to the TAWS functions, specific to these procedures for detecting a potential risk of collision of the aircraft with the terrain when following procedures with a reduced protection corridor type, wherein a specific warning is generated by the system when, in RNP mode, it determines, under the prescribed altitude of the RNP trajectory, a distance between the profile of a clearance sensor and the profile of the terrain being flown over that is less than a predetermined threshold.

11. Method according to claim 10, wherein the warning is a "recover altitude" warning.

12. Method according to claim 10, wherein the system compares, in a vertical plane, the profile of each clearance sensor with the profile of the terrain being flown over, under the duly determined clearance sensors, and that a warning is issued when the distance between these two profiles drops below a determined threshold (M).

13. Method according to claim 10, wherein said additional function is conferred on the TAWS functions when the aircraft follows a Required Navigation Performance (RNP) procedure.

* * * * *